Jan. 13, 1942.                W. F. GROENE ET AL                2,269,908
                    MULTIPLE SPINDLE INDEXING CRANKSHAFT LATHE
                          Filed Jan. 31, 1941            4 Sheets-Sheet 1
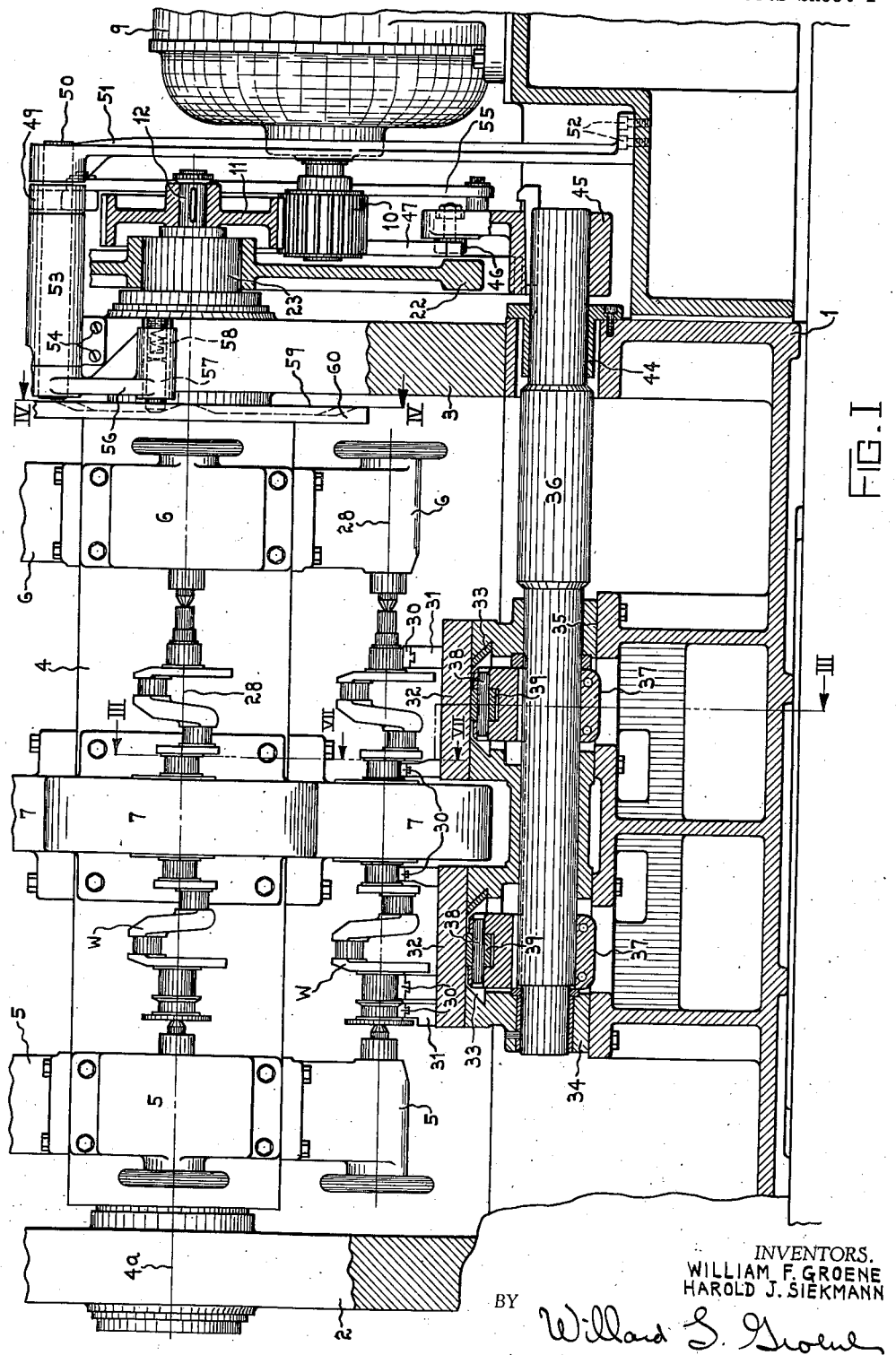
FIG. I
INVENTORS.
WILLIAM F. GROENE
HAROLD J. SIEKMANN
BY Willard S. Groene

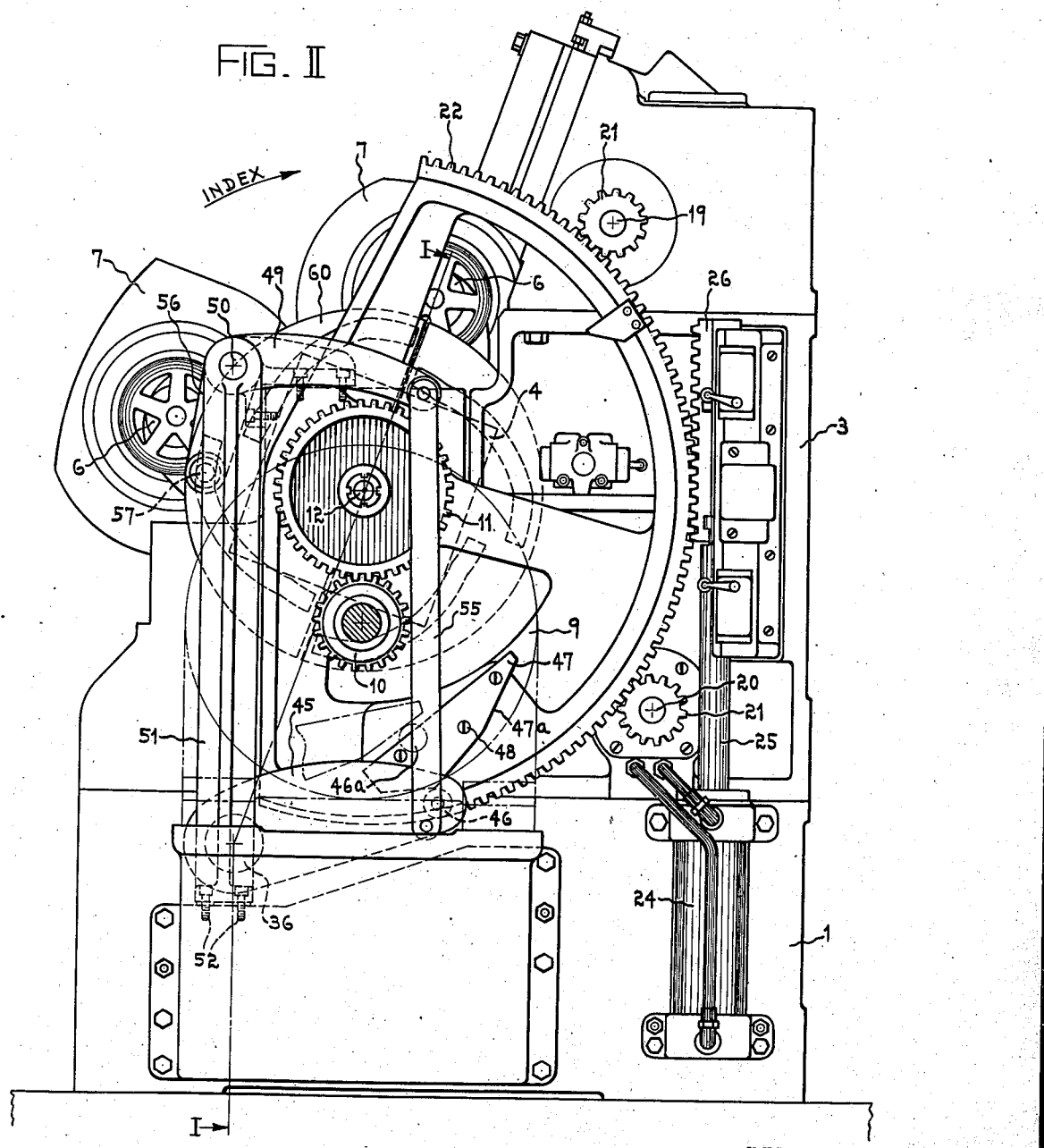

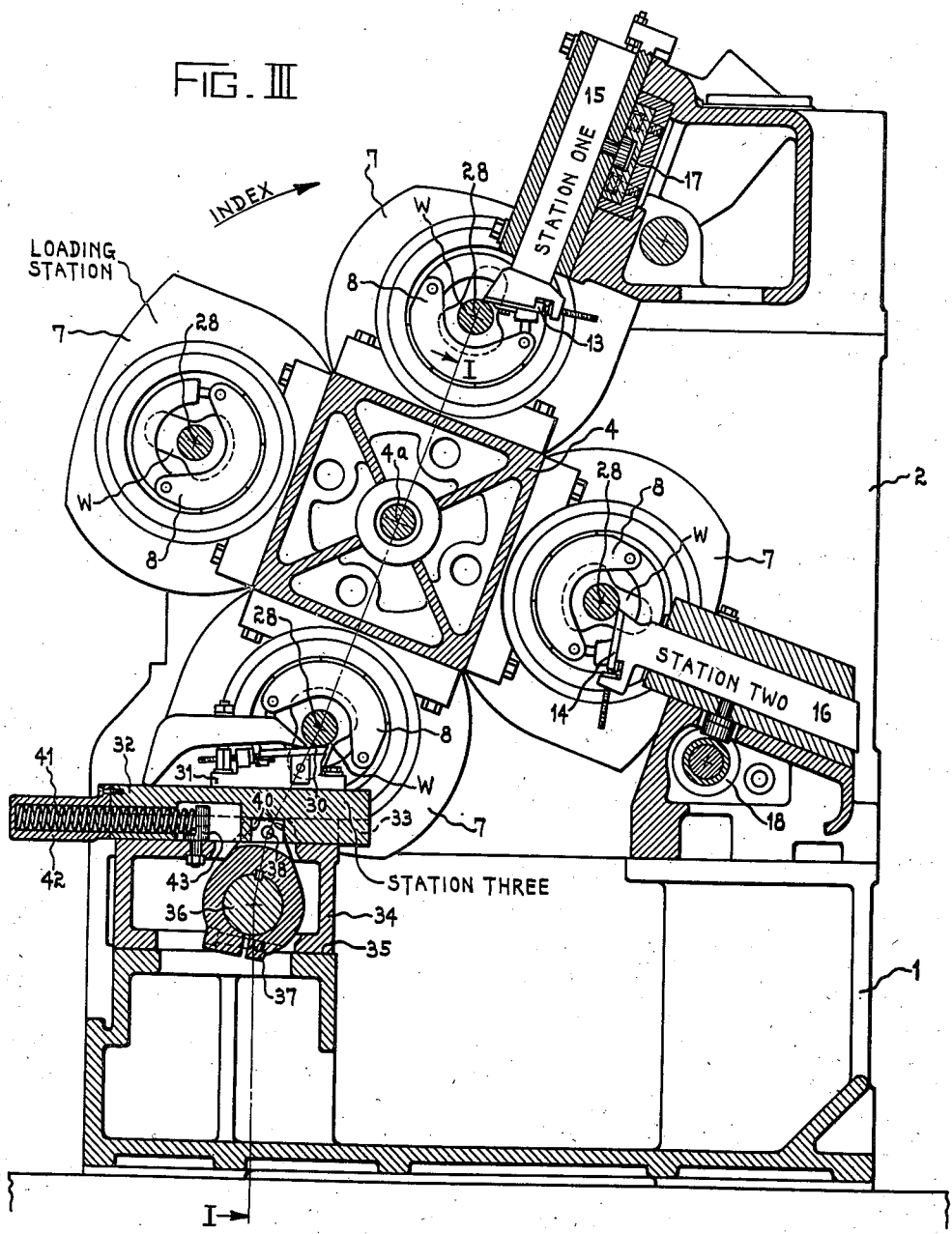

Jan. 13, 1942.  W. F. GROENE ET AL  2,269,908
MULTIPLE SPINDLE INDEXING CRANKSHAFT LATHE
Filed Jan. 31, 1941  4 Sheets-Sheet 4
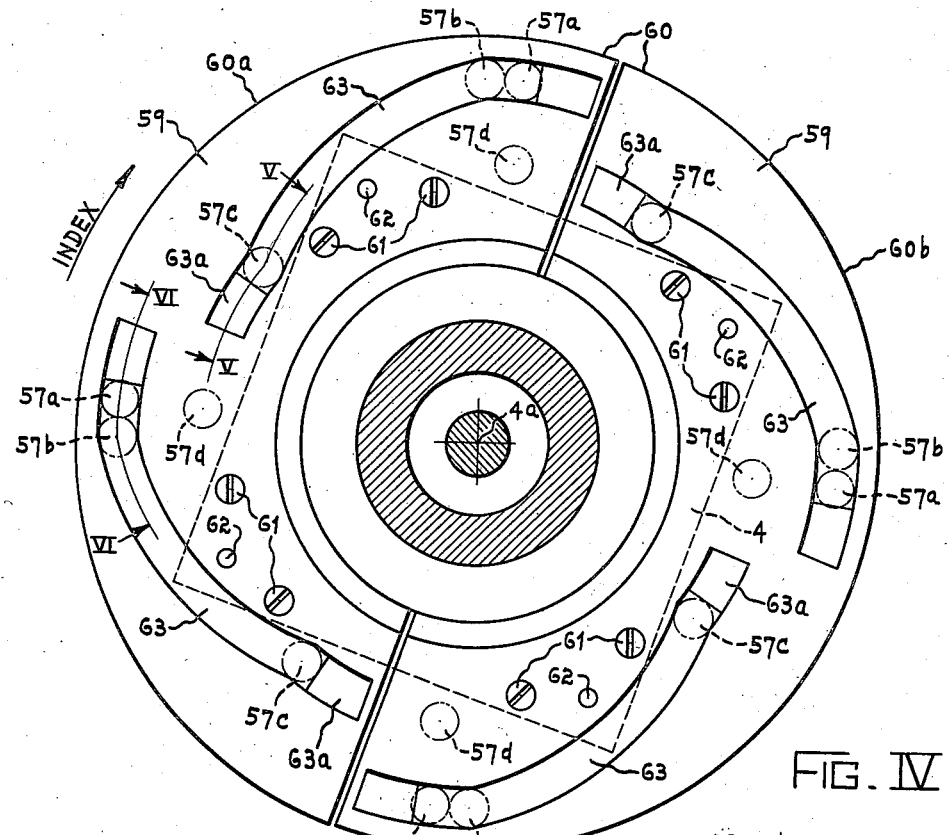
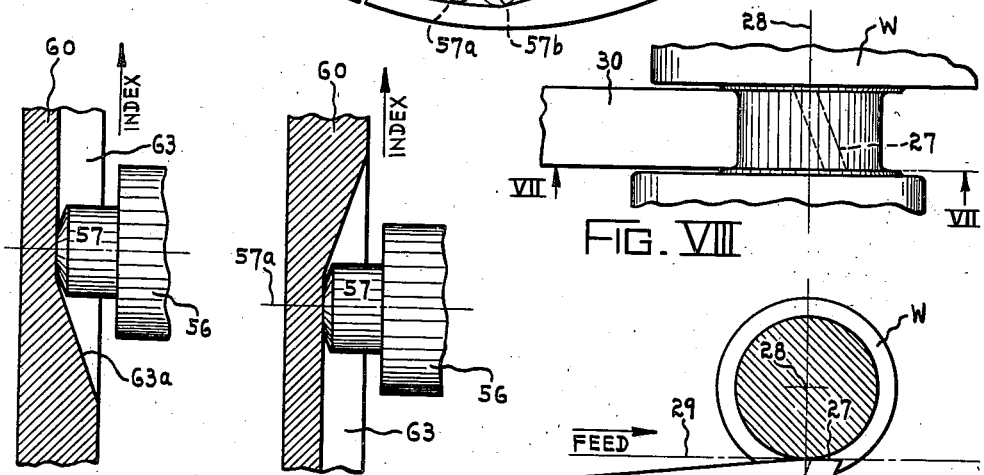
INVENTORS.
WILLIAM F. GROENE
HAROLD J. SIEKMANN
BY Willard S. Groene Patented Jan. 13, 1942

2,269,908

UNITED STATES PATENT OFFICE 2,269,908

MULTIPLE SPINDLE INDEXING CRANKSHAFT LATHE

William F. Groene and Harold J. Siekmann, Cincinnati, Ohio, assignors to The R. K. Le Blond Machine Tool Company, Cincinnati, Ohio, a corporation of Delaware Application January 31, 1941, Serial No. 376,878

7 Claims. (Cl. 29—38)

This invention pertains to certain improvements in multiple spindle indexing lathes, and is particularly related to such multiple spindle crankshaft lathes of a type shown in Patent Number 2,138,522, issued November 29, 1938, and in copending application, Serial Number 332,540, filed April 30, 1940. More specifically, this invention pertains to the controlling of the movement of the cutting tools of such lathes in relation to the indexing movement of the machine in such a way as to prevent damage and marring of the work by the cutting tools as they are retracted from the work after completing the machining operation on the work pieces in the various work spindles.

In machines of this multiple spindle indexing type, it has been found, that after the cutting tools have been fully fed in to the work and have been held in dwell position, that in certain instances it is desirable to begin the indexing of the work spindles away from their respective work stations before the cutting tools are moved back away from the work so as to prevent this rearward motion of the cutting tools from marring the previously turned work surface. Especially is this true when tools of the shaving or broaching type are used, because these types of tools are fed past the work piece so that when they are fully fed into the work, their cutting edges are slightly beyond the work surface turned, with the result that when they are moved backwardly, without first indexing the work away from actual cutting position, the returning cutting edge of these types of tools mar the work in moving back to their retracted position.

It is therefore one of the chief objects of this invention to so control the tool movements and indexing mechanism of a lathe of this type in such a way that the indexing initially takes place so as to begin movement of the work away from actual cutting position when the tools are in fully fed in position and then to later on, during the continuation of this indexing motion, continue the rearward motion of the tools back to their retracted position ready for the beginning of another cutting cycle.

In certain other instances it is desirable to immediately retract the tools and index the work at some of the work stations while the tools at other of the work stations delay their retracting movement until the indexing motion has gotten under way.

Another object of this invention is to provide, in a multiple spindle indexing lathe, means operated by the movement of the indexing work spindles to effect the return action of the cutting tools from fully fed in position and then to bring these cutting tools to their fully retracted position after said delay period by the further indexing of said work spindles to bring a new set of work spindles to the work station, and then to provide means whereby the feeding mechanism automatically regains control of the cutting tools to again feed them to fully fed in position independent of the indexing motion of said work carrier.

Further features and advantages of this invention will appear from the detailed description of the drawings in which:

Figure I is a fragmentary diagrammatic view of a portion of a 4 spindle drum type crankshaft lathe of a type shown in the above mentioned patent and application shown partly in section on the line I—I of Figures II and III.

Figure II is a right hand end elevation of such a multiple spindle indexing lathe showing the actuating mechanism for the shaving tools provided at work station three for effecting the delayed return action of these shaving tools in relation to the indexing of the work spindle carrier.

Figure III is a transverse section through the machine on the line III—III of Figure I.

Figure IV is an enlarged end view of the actuating cam mounted on the indexing work spindle carrier drum shown on the line IV—IV of Figure I.

Figure V is an enlarged fragmentary section of one of the cam slots of the cam shown on the line V—V of Figure IV.

Figure VI is a similar enlarged fragmentary view of another portion of one of the cam slots shown by the line VI—VI of Figure IV.

Figure VII is an enlarged diagrammatic view showing the relationship of the shaving tool at the third work station with respect to the work surface being machined on a work piece at said work station indicated by the line VII—VII of Figure I.

Figure VIII is a fragmentary plan view of the work and tool shown in Figure VII.

For purposes of an exemplary disclosure, this invention is shown applied to a four-spindle drum type crankshaft line bearing lathe of a type shown in the above mentioned patent and application. This machine comprises a base 1 upon each end of which is mounted the upright housings 2 and 3, which carry the indexing work spindle carrier drum 4 upon which are mounted work spindles comprising the tailstocks 5 and 6 and the center drive chuck housings 7 in which is suitably mounted center drive chucking mechanism 8, for example, of a type shown in Patent 2,131,698, issued September 27, 1938. These center drive work spindles may be driven from the main drive spindle motor 9, through its motor pinion 10 and the gear 11 carried on the main drive shaft 12 in a manner as fully disclosed in the above mentioned patent, so that these work spindles may all be driven during the turning operation at the various work stations and may be stopped and started when the respective work spindle is brought into the loading station.

These various work stations comprising work station one, work station two, and work station three, and also the loading station are arranged as shown in Figure III. At work stations one and two are respectively mounted the cutting tools 13 and 14, carried on their respective tool feeding slides 15 and 16 and are actuated for radial to and from feeding with respect to the work W in the work spindles presented at these work stations one and two by feeding mechanism as fully disclosed in the above mentioned patent, which comprises suitable cam actuating mechanism 17 and 18 which is driven from the various feed shafts 19 and 20 upon the outer ends of which are mounted the feed pinions 21, as best seen in Figure II, in which pinion 21 is engaged by the segmental feed gear 22, appropriately journaled on the bearing surface 23, provided on the outwardly projecting end of the indexing work carrier drum 4, as fully disclosed in this mentioned patent, so that as the segmental gear 22 is rocked back and forth by means of the feed cylinder 24, Figure II, having a piston rod 25 which operates the floatingly reciprocatable rack 26 in engagement with the segmental gear 22, these respective tools at work stations one and two may be fed radially to and from the various work spindles presented at these work stations.

The relationship of the indexing of the work carrier 4 in relation to the movement of the tools at work stations one and two is such that after the cutting tools at these work stations have finished their work, they are then automatically returned to fully retracted position whereupon the indexing of the work carrier then takes place in a manner and by means of apparatus as fully set forth in the above mentioned patent, so that these tools at work stations one and two are in fully retracted positions before the indexing of the work carrier actually takes place.

At work station three is provided a series of special type of finishing tools known as shaving tools which have cutting edges angularly related to the axis of rotation of the work 28 and which cutting edges 27 feed tangentially of the work in a plane 29 indicated in Figure VII so that when the tool feeds to the right, Figure VII, these shaving tools 30 actually present their cutting edges 27 beyond and away from contact with the work piece at the time they are fully fed in toward the work. It has been found that in such types of tools, with the work still rotating and in cutting position, that were the shaving tools 30 retracted back again along the plane 29, that the respective edges 27 would have a tendency to spring slightly back against the work and would cause a marring or scratching of the finished work surface. It is therefore, the chief object of this invention to so time the indexing of the work carrier 4 with respect to the withdrawal of the shaving tools 30 that their cutting edges 27, after they have once been moved to fully fed in position, do not begin to pass back over the tangentially feeding path 29 to mar the work until the indexing motion of the work carrier has gotten under way. This is accomplished by initially starting the indexing of the work carrier 4 and work spindles before permitting the tools 30 to move back in their retracting movement to the initial starting position.

These shaving tools 30 are carried on appropriate tool blocks 31, which are fixed on the tool feeding slides 32 mounted on suitable dove tail guideways 33 in the frame 34 fixed to the mounting surface 35 formed on the base 1 of the machine. Journaled in this frame 34, is the rock shaft 36 having lever arms 37 fixed thereon which are connected by means of suitable pivot pins 38 to the blocks 39 which operate in appropriate slots 40, formed in these slides 32, so that rocking of the shaft 36 effects sliding movement of the slides 32 to and from the work on their respective dove tail guideways 33. A compression spring 41 provided for each of the slides 32, is carried in a bracket 42 fixed to each of the slides 32 and engage abutment blocks 43 fixed to the frame 34, as best shown in Figure III, normally to urge the slide to withdrawn position so that the feeding action effected in these slides by the shaft 36 is normally opposed by these springs 41.

The outer end of the rock shaft 36 is journaled in a suitable bearing bracket 44 fixed to the base 1 of the machine and has fixed on its outer end an actuating lever 45 which has a cam engaging roller 46 which operates against the surface 47a of the feed cam 47 fixed to the segmental gear 22 by suitable screws 48, so that as the feed cylinder 24, Figure II, actuates the segmental gear in infeeding motion to effect movement of the tools at work stations one and two the surface 47a of the cam 47 engaging the roller 46 will automatically cause the tool slide 32 carrying the shaving tools 30, to be fed into the work along the plane of feeding 29, Figure VII, at the appropriate rate, so that the roller 46 moves relatively from the position 46a to the position 46, as shown diagrammatically in Figure II, thereby bringing these shaving tools 30 to the fully fed in position as shown in Figure VII when the roller has reached the point 46 as shown in Figure II.

Having thus accomplished the infeeding of all of the cutting tools at work stations one and two and the shaving tools at work station three, appropriate control mechanism, as fully disclosed in the above mentioned patent, then operates so that the cutting tools at work stations one and two are then fully retracted. Upon reaching their retracted position, indexing power is then applied to the work carrier 4 as disclosed in the above mentioned patent, to initiate the indexing motion of the drum 4.

During the time of infeeding of the cutting tools 30, apparatus has been set in position to prevent the immediate withdrawal of the cutting tools 30 simultaneously with the return movement of the cutting tools at work stations one and two. This mechanism comprises a lever 49, which is fixed on a rock shaft 50, which rock shaft is appropriately journaled in an upright bracket 51 fixed to the base 1 of the machine, by suitable screws 52 and also supported in a bracket 53, suitably mounted on the housing 3 by appropriate screws 54 and which lever 49 is connected by a suitable link 55 with the lever 45. At the other end of the rock shaft 50 is provided a downwardly extending lever 56, in which is carried a spring urged plunger 57, which is normally urged to the left of Figure I by a suitable compression spring 58 to engage against the face 59 of a disc cam 60 comprising the segmental gib 60a and 60b appropriately fixed to the indexing work spindle carrying drum 4 by suitable screws 61 and pin 62, so that this cam 60 is carried around by the indexing motion of the drum 4.

On each of these segments 60a and 60b are provided a series of cam slots 63, one for each work spindle presented to the work station three, in this case, there being four slots 63 since there are four work spindles to be presented to work station three. When the cutting tools and the shaving tools at all the work stations are in fully fed in position, as shown in Figure II, the spring urged plunger 57 has a relative position with respect to a cam slot 63 in the disc cam 60 as shown at 57a in Figure IV, being entered into the slot 63 as shown in detail in Figure VI. After the cutting tools at work stations one and two have fully withdrawn and set the indexing motion in operation, the relative movement of the plunger 57 in the cam slot 63 as caused by the indexing motion of the drum 4, causes the plunger 57 to move relatively from the position 57a to the position 57b, during which portion of the cam slot 63 the plunger 57 has no relative movement with respect to the axis of rotation 4a of the indexing work carrier 4, so that the tools 30 on the slides 32 will be held in their fully fed in position even though the indexing motion has initially taken place and as a result, the roller 46 on the lever 45 will be withheld away from contact with the surface 47a of the feed cam 47 on the segmental gear 22. However, upon further indexing of the work spindle carrier 4 after the work has initially been moved or indexed away from cutting position with respect to the tools 30, these tools are then permitted to withdraw back to initial starting position as the plunger 57 relatively moves from the position 57b as indicated in the Figure IV. At the point 57c the tools 30 are thus fully retracted to their initial starting position and are again in proper timed relationship with the cutting tools at work stations one and two, the roller 46 on the lever 45 again being presented to the cam 47, as shown at 46a in Figure II. Further indexing however, of the work carrier 4 to its final indexed position presenting another series of work spindles to the work stations causes the plunger 57 to move to the relative position 57d at which point it arrives and remains so far as circular movement about the cam 60 is concerned during the infeeding motion of the various cutting tools to the work.

Having thus again brought the machine in condition for the next cutting cycle, feed is again instituted by appropriately applying fluid pressure to the cylinder 24 causing the cutting tools at work stations one and two to feed inwardly and likewise through the medium of the cam 47 and the roller 46 of the lever 45, the feed of the shaving tools 30 then takes place, it being noted distinctly that the plunger 57 has now ridden out of one of the cam slots 63 by proceeding upwardly on the angularly related surface 63a Figure V on to the flat surface 59 of the cam 60 so that it is free to move radially on this surface with respect to the axis 4a of the work indexing carrier 4, so that as this gib treating of the cutting tools 30 takes place, the plunger moves radially outward on this face 59 of the cam 60 from the position 57d to the position 57a again repeating, so that it can again initially drop into the slot under the influence of the compression spring 58 and resume its position preparatory to delaying the return action of the shaving tools 30 at the completion of the cutting cycle as described.

We have thus provided an arrangement whereby a series of cutting tools may be fed into the work of a multiple spindle indexing machine in such a manner that at the completion of the in feeding motion of the tools indexing motion may be initially started before immediately returning the cutting tools to their retracted position so as to avoid the return of the cutting tools again over the work surface already machined, thereby preventing damage and marring of the machined work piece. Expressed another way, we have provided in an indexing lathe, means whereby the cutting tool may be fed into the work and whereby the return motion of these cutting tools may be delayed during the initial motion of indexing of the work spindles away from the cutting tools before instituting the withdrawal motion of the cutting tools so as to prevent cutting edges of the tools from again passing over the work surfaces previously machined by the infeeding motion of the tools.

Having thus fully set forth and described our invention what we claim as new and desire to secure by United States Letters Patent is:

1. In a machine tool, an indexing work carrier, a work spindle on said carrier, indexing means for moving said carrier to present said work spindle to a work station of said machine tool, cutting tools at said work station, means independent of said indexing means for feeding said cutting tools to said work spindle when at said work station, and means on said indexing work carrier for controlling the return motion of said tools from said work spindle independent of said feeding means for said cutting tools to delay the return motion of said tools until after said indexing work spindle carrier has partially moved said work spindle away from said work station.

2. In a multiple spindle lathe, a rotatable indexing work carrier, a series of work spindles on said work carrier, means for indexing said work carrier to successively present each of said work spindles to a work station of said machine tool, cutting tools at said work station, means independent of said indexing means for feeding said cutting tools to a work spindle when presented to said work station, and means on said work spindle carrier to effect withdrawal of said cutting tools from the work spindle at said work station as said carrier indexes a work spindle to the next work station.

3. In a machine tool, a work spindle carrier, a plurality of work spindles mounted on said carrier, means for indexing said carrier so as to successively present said work spindles to a work station of said machine tool, cutting tools at said work station, means independent of said indexing means for feeding said cutting tools to and from a work spindle when presented at said work station, and means on said work spindle carrier effective when said carrier is indexed to cause delayed return of said tools from fully fed in position relative to said work spindle at said work station until the next work spindle has started on its way for presentation to said work station.

4. In a multiple spindle lathe, an indexing work spindle carrier, a plurality of work spindles mounted on said carrier, indexing means for moving said carrier to successively present said work spindles to a series of work stations of said lathe, cutting tools at said work stations, means independent of said indexing means for feeding said cutting tools to said work spindles when presented at said work stations, and means on said indexing work carrier independent of said feeding means for controlling the return motion of said cutting tools.

5. In a multiple spindle indexing machine tool, a work spindle carrier, a series of work spindles mounted on said carrier, means for indexing said carrier so as to successively present a series of work spindles to a series of work stations of said machine tool, cutting tools at said work stations, means independent of said indexing means for feeding said cutting tools to said work spindles when presented at said work stations, and means on said work spindle carrier independent of said feeding means for returning some of the cutting tools at some of said work stations after said work spindle carrier has begun a partial indexing movement in presenting the next series of work spindles to said work stations.

6. In a multiple spindle indexing machine tool, a work spindle carrier, a series of work spindles mounted on said carrier, means for indexing said carrier so as to successively present said work spindles to a series of work stations of said machine tool, cutting tools arranged at each of said work stations, common means independent of said indexing means for feeding all of said cutting tools to said work spindles when at said work stations, said means also serving to withdraw some of said tools to retracted position away from said work spindles, and means on said work spindle carrier independent of said feeding means for controlling the return motion of some of said cutting tools by the indexing movement of said carrier.

7. In a multiple spindle indexing machine tool, a work spindle carrier, a series of work spindles mounted on said carrier, means for indexing said carrier so as to successively present said work spindles to a series of work stations of said machine tool, cutting tools at each of said work stations, common means independent of said indexing means for feeding all of said cutting tools to said work spindles when at said work stations, said means also serving to withdraw some of said tools to retracted position away from said work spindles, means independent of said feeding means on said work spindle carrier operatively connected to some of the tools at some of said work stations whereby rotation of said work spindle carrier effects delayed return motion of some of these cutting tools with respect to the work spindles while said work spindles are being initially indexed away from cutting position for presentation of a new series of work spindles to said work stations.

WILLIAM F. GROENE.
HAROLD J. SIEKMANN.